June 9, 1931.  C. O. SATHER ET AL  1,809,728
FISHERMAN'S LINE DRIER
Filed April 23, 1930
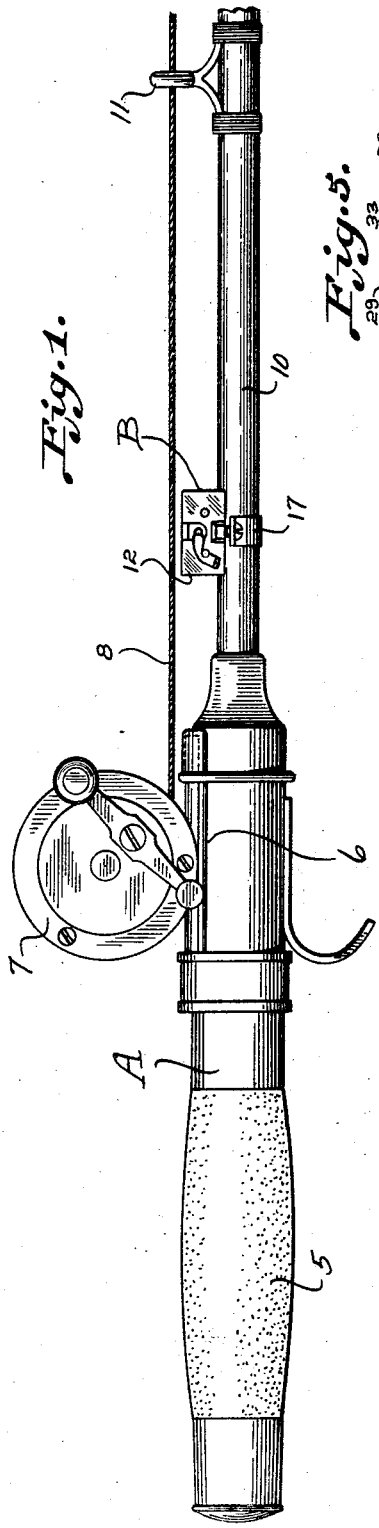
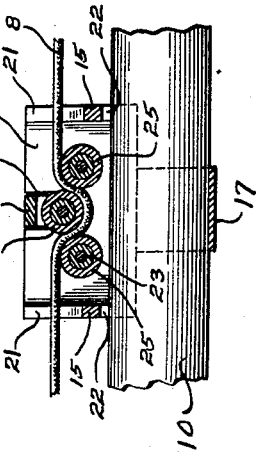
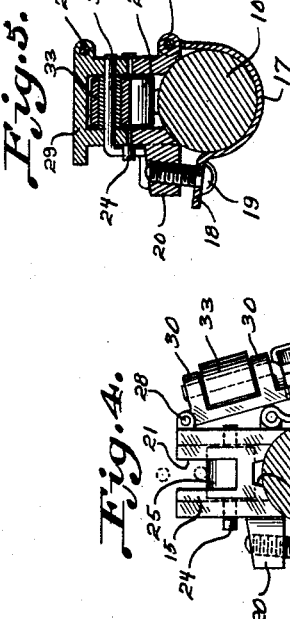
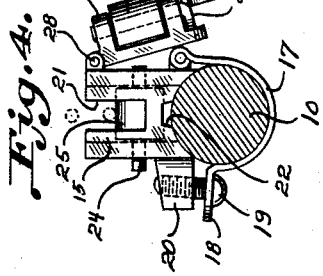
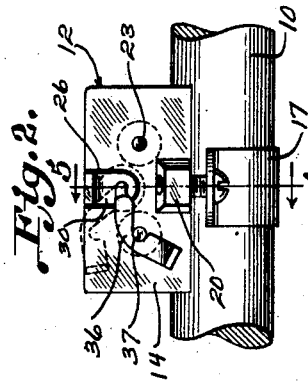
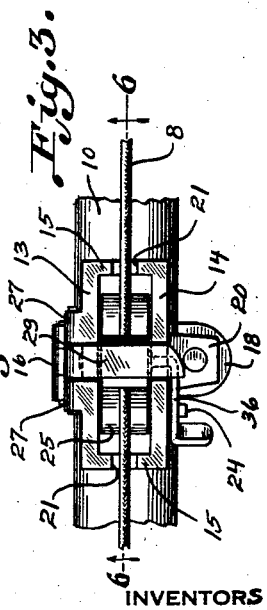
INVENTORS
Carl O. Sather
AND Felix P. Sampson
BY Lancaster, Allwine & Rommel
ATTORNEYS.

Patented June 9, 1931

1,809,728

UNITED STATES PATENT OFFICE

CARL O. SATHER AND FELIX P. SAMPSON, OF MINNEAPOLIS, MINNESOTA

FISHERMAN'S LINE DRIER

Application filed April 23, 1930. Serial No. 446,742.

The present invention relates to fishing apparatus and more specifically to a line drier for fishing rods.

The primary object of the invention is to provide a fisherman's line drier adapted for attachment to fishing rods for wringing water out of the fishing line before being wound upon the reel.

A further object of the invention is to provide a device of this character which may be readily applied to casting rods without causing entanglement of the line during casting or winding in of the line.

A further object of the invention is to provide a device of this character which may be readily applied to various types of fishing rods without interfering with ordinary use of the rods, and embodying a construction whereby the line will be positively guided between a series of wringing rollers so that the line is practically dried before being wound upon the reel.

A still further object resides in the novel mounting arrangement for the swinging roller and the manner of releasably retaining the swinging roller in operative relation to the companion rollers.

Briefly, the invention resides in the provision of a line drier of very small overall dimensions, adapted to be applied to the grip joint of a fishing rod so as to not interfere with ordinary use of the rod when casting, and which device may be readily opened for receiving the line in a manner whereby water may be wrung from the line when the operator ceases fishing.

Other objects and advantages of the invention will be apparent during the course of the following detailed description, taken in connection with the accompanying drawings forming a part of this specification and in which drawings:

Figure 1 is a fragmentary side elevation of the hand gripping end of a fishing rod and showing the improved drier attachment applied thereto.

Figure 2 is an enlarged view in side elevation of the device applied to the fishing rod.

Figure 3 is a top plan view of the device shown applied and the manner in which the line is trained thru the device.

Figure 4 is an end elevation of the device showing the same in an open position for receiving the line.

Figure 5 is a section on line 5—5 of Figure 2.

Figure 6 is a section on line 6—6 of Figure 3 and showing the manner in which the line is trained between the wringing rollers.

In the drawings, and wherein similar reference characters designate corresponding parts thruout the several views, the letter A may designate a fishing rod of conventional construction and B the improved line drier or wringer for attachment to the rod A.

The rod A embodies the usual hand grip portion 5 provided with the reel seat 6 for attachment of the reel 7 upon which the line 8 is wound. Projecting forwardly from the hand grip portion 5 is the grip joint section 10 provided with the usual guide 11 thru which the line 8 is guided to the tip of the fishing rod. The rod of course may be of any construction and provided with one or more of the sections 10.

The improved drier or wringer B which is adapted for attachment to the rod section 10 between the reel 7 and guide 11 so as to be in convenient reach of the user, embodies an open rectangular-shaped box-like casing or frame 12 embodying parallel side walls 13 and 14 and end walls 15. The casing 12 is open at its top and bottom and the bottom of the casing is transversely concaved as clearly shown in Figure 4 for conforming to the round surface of the rod section 10. As will be observed, the casing is mounted longitudinally of the section 10 in alignment with the line 8. The casing is of such height that when applied to the rod section the line 8 will not contact with the drier but will pass freely thereover as shown in Figure 1.

Formed integral with the lower edge of the side wall 13 at a point intermediate the ends of the wall is a hinge sleeve 16 to which is hingedly connected a clamping band 17 adapted to extend beneath the rod section 10 with its end outturned as at 18 and apertured for receiving therethru a clamping screw 19 adapted to be threaded into a threaded opening provided in a clamping lug 20 projecting from the lower edge of the side wall 14. When the casing is thus clamped by the clamping means to the rod section, the transversely concaved bottom of the casing will prevent the casing from shifting out of longitudinal alignment with the rod section 10.

Each end wall 15 is formed with an upwardly opening guide slot 21 and these guide slots 21 are arranged midway between the side walls 13 and 14. Each of the end walls 15 is also provided with a drain slot 22 which are preferably arranged directly beneath the guide slots 21. These drain slots 22, when the casing is applied to the rod section, form openings permitting water to readily drain from either end of the casing during the wringing operation.

Mounted transversely in the lower portion of the casing 12 is a pair of parallel spaced apart bearing pins 23 the ends of which may be suitably secured in any desired manner in the side walls 13 and 14. One end of the rear bearing pin extends thru and projects beyond the outer surface of the side wall 14 to form a latch pin 24 for a purpose to be subsequently explained. These bearing pins 23 as will be observed are mounted adjacent opposite ends of the casing and each bearing pin rotatably supports a wringer roller 25. These lower wringer rollers 25 are preferably formed with metal sleeves rotatable on the bearing pins and about which sleeves a yieldable covering such as rubber or the like is provided. The wringer rollers 25 are of a length substantially greater than the width of the guide slots 21 and are so mounted as to have their upper surfaces arranged above the bottoms of the guide slots.

Formed midway between the ends of each side wall 13 and 14 and opening at the upper edges thereof is a key slot 26 and these key slots as will be observed align transversely of the casing at a location between the wringer rollers 25. Formed at each side of the slot 26 formed in the side wall 13 and at the upper edge of the wall, is a hinge sleeve 27 for receiving the ends of a hinge pin 28 pivotally supporting a substantially U-shaped yoke embodying a cross bar 29 and depending side arms 30. The hinge pin 28 extends thru one end of the cross bar 29 whereby the yoke has a swinging movement transversely of the casing. When the yoke is in a closed position the cross bar 29 extends flush with the upper edges of the casing walls and the side arms 30 extend into the key slots 26 in alignment with the side walls 13 and 14. Journaled in the side arms 30 is a pivot pin 32 on which is rotatably mounted an upper wringer roller 33 which moves to a parallel contacting position between the lower wringer rollers 25 when the yoke is in a closed position. This wringer roller 33 is of like construction as that of the rollers 25 and preferably embodies an inner metallic sleeve for rotation about the pin 32.

Preferably formed integral with one end of the pivot pin 32 is a latch arm 36 of substantially L-shape and provided with a notch 37 for locking engagement with the latch pin 24 whereby the swinging yoke is releasably retained in a closed position transversely across the casing 12. One end of the cross bar 29, at the free or swinging end of the bar preferably projects slightly beyond the side arm 30 to form a stop for limiting upward swinging of the latch arm as shown by dotted lines in Figure 2. The latch arm 36 lies substantially flat against the side casing wall 14 when engaging the latch pin 24 so as to prevent possible wedging or catching of the line 8 during normal use of the rod.

In use, and with the drier or wringer in a closed and latched position as shown in Figure 1, the line will have free movement between the reel and guide 11 and allow for casting in the usual manner or winding of the line upon the reel with little or no likelihood of the line becoming entangled with the drier. When desiring to dry the line, it is merely necessary to unlatch the latch arm 36 and swing the roller carrying yoke to an open position as shown in Figure 4 whereupon the line may be lowered into the guide slots 21 and rest upon the lower wringer rollers 25. The yoke is then swung to a closed position whereupon the upper or wringer roller 33 will wedge the line in a manner as shown in Figure 6. The latch arm 36 is then caught over the latch pin 24 which moves the yoke in its closed position with the roller 33 in operative relation to the rollers 25. The reel 7 may then be operated for winding in the line 8 and as the line is drawn between the wringing rollers the water will be wrung from the line and allowed to escape from the casing thru the drain slots 22. As the line is drawn thru the drier the guide slots 21 serve to prevent the line from working over the ends of the wringer rollers and becoming wedged between the ends of the rollers and side walls of the casing.

From the foregoing description it will be apparent that a novel and improved device has been provided which will not interfere with ready use of the fishing pole. The device is of a construction to prevent entanglement of the cord, owing to the small overall size of the device. It will also be apparent that the device is readily adaptable for attachment to practically any type of fishing or casting pole and may readily be opened for receiving the line in an efficient manner when desiring to dry the line.

Changes in the size, shape and arrangement of parts may be made to the form of invention herein shown and described, without departing from the spirit of the invention or the scope of the following claims.

We claim:

1. A line drier for fishing rods comprising a casing for attachment longitudinally of the rod, wringer rollers mounted transversely in the casing, means for guiding the line longitudinally thru the casing and over the rollers, and a wringing roller pivotally carried by the casing for clamping the line therebetween and said first mentioned rollers.

2. A line drier for fishing poles comprising a hollow casing, means for attaching the casing longitudinally of the pole, wringer rollers mounted transversely in the casing, means for guiding the line longitudinally thru the casing and over the rollers, a yoke pivotally carried by the casing, a wringer roller carried by the yoke for clamping the line therebetween and said first mentioned rollers, and latch means for receiving the yoke in a closed position on the casing.

3. A line drier for fishing poles comprising an elongated hollow casing having a transversely concaved lower side, means for attaching the casing longitudinally of the pole with the pole engaging the concaved lower side of the casing, wringer rollers mounted transversely in the casing, means for guiding the line longitudinally thru the casing and over the rollers, a yoke pivotally carried by the casing, a wringer roller carried by the yoke for movement into a position above the line, and latch means for retaining the yoke in a closed relation upon the casing.

4. A line drier for fishing poles comprising an open box-like casing for attachment longitudinally of the pole, wringer rollers mounted transversely in the casing, a guide slot provided in each end wall of the casing for guiding the line over the rollers, a yoke pivotally carried by the casing for swinging movement transversely thereof, a wringer roller carried by the yoke for clamping the line therebetween and said first mentioned rollers, and latch means for releasably retaining the yoke in a closed position.

5. A line drier for fishing poles comprising an open casing embodying side and end walls, means for attaching the casing longitudinally of the pole, an upwardly opening guide slot provided in each end wall of the casing at the longitudinal center thereof, a pair of lower wringer rollers mounted transversely in the casing between the side walls, a U-shaped frame pivotally mounted intermediate the end of the casing for swinging movement transversely thereof and embodying a pair of side arms, an upper wringer roller rotatably mounted between the side arms for co-acting with the lower wringer rollers when the frame is in a closed position transversely of the casing, and latch means for retaining the U-shaped frame in a closed position.

6. A line drier for fishing poles comprising an elongated open casing having a transversely concaved lower side, a clamping band hingedly connected to one side of the casing and having an apertured end, a clamp lug projecting laterally from the opposite side of the casing, a clamping screw extending thru the apertured end of the band for threaded engagement in the clamping lug for mounting the casing longitudinally of a fishing pole, lower wringer rollers mounted transversely in the casing, guide slots in each end of the casing for guiding the line longitudinally thru the casing and over the rollers, and an upper wringer roller pivotally carried by the casing for movement into wringing relation with the lower wringer rollers.

7. A line drier for fishing rods comprising an open casing embodying side and end walls, means for attaching the casing longitudinally of a fishing rod, a drain slot provided in the lower edge of each end wall, an upwardly opening guide slot provided in each end wall and aligning at the longitudinal center of the casing, a pair of lower wringer rollers mounted transversely in the casing, a yoke pivotally mounted intermediate the ends of the casing for swinging movement transversely thereof and embodying a pair of side arms, an upper wringer roller mounted between the side arms for co-acting with the lower wringer rollers, and latch means for retaining the yoke in a closed position transversely of the casing.

8. A line drier for fishing rods comprising an open casing embodying parallel end and side walls, said end walls each being provided with an upwardly opening guide slot and said side walls each being provided with an outwardly opening key slot, a pair of wringer rollers mounted transversely in the casing at opposite sides of the key slot, a yoke embodying a cross bar pivotally mounted upon one of the side walls and side arms for extending into said key slots, an upper wringer roller mounted between the side arms for co-acting with the lower wringer rollers, and a latch for retaining the yoke in an operative position transversely of the casing.

9. A line drier comprising an open rectangular-shaped casing embodying end and side walls, said end walls each being provided with an upwardly opening guide slot for guiding a line longitudinally thru the casing, bearing pins mounted in the side walls to extend transversely of the casing with one of said pins projecting beyond one of the side walls to form a latch pin, a wringer roller revolubly mounted on each bearing pin, a yoke pivotally carried by the intermediate portion of the casing for swinging movement transversely thereof, and embodying a pair of side arms, a pivot pin pivotally mounted in the side arms, a wringer roller revolubly mounted upon the pivot pin between the side arms, and a latch arm formed on one end of the pivot pin for latching engagement with said latch pin.

CARL O. SATHER.
FELIX P. SAMPSON.